J. N. LAMAR.
ANTIFRICTION JOURNAL BEARING FOR AXLES OR SHAFTS.
APPLICATION FILED JAN. 15, 1916.
1,180,662.
Patented Apr. 25, 1916.
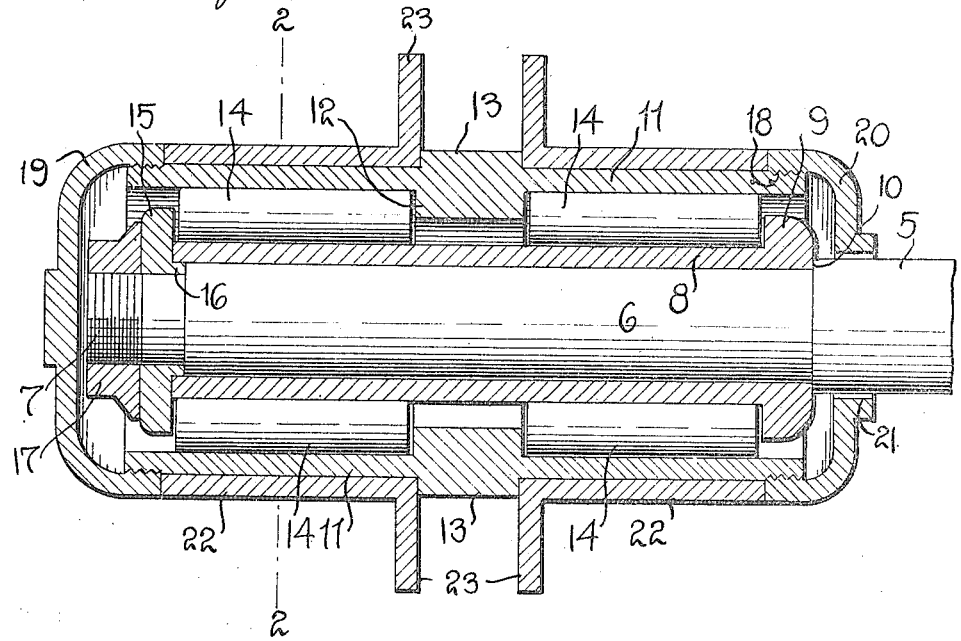
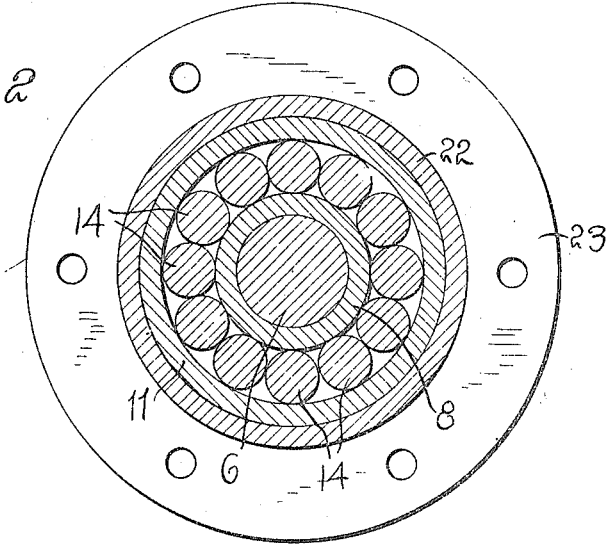
Inventor
J. N. LAMAR
By Watson E. Coleman
Attorney

UNITED STATES PATENT OFFICE.

JEFF N. LAMAR, OF TUPPER LAKE, NEW YORK.

ANTIFRICTION JOURNAL-BEARING FOR AXLES OR SHAFTS.

1,180,662.

Specification of Letters Patent.

Patented Apr. 25, 1916.

Application filed January 15, 1916. Serial No. 72,265.

*To all whom it may concern:*

Be it known that I, JEFF N. LAMAR, a citizen of the United States, residing at Tupper Lake, in the county of Franklin and State of New York, have invented certain new and useful Improvements in Antifriction Journal-Bearings for Axles or Shafts, of which the following is a specification, reference being had to the accompanying drawings.

This invention relates to an improved anti-friction journal bearing for axles or shafts and has for its primary object to produce a simply constructed and inexpensive device of this character which may be advantageously used upon the axles or shafts of vehicle wheels, revoluble machine elements and the like, in order that friction may be reduced to a minimum.

The invention has for an additional object to provide a shaft or axle bearing of the anti-friction roller type which is so constructed that the several elements thereof may be easily and quickly assembled or disassembled, and when in their relative operative positions are completely housed and protected against the entrance of dust or other foreign matter to the interior of the bearing.

With the above and other objects in view, my invention consists in the novel features of construction, combination and arrangement of parts to be hereinafter more fully described, claimed and illustrated in the accompanying drawing, in which, Figure 1 is a longitudinal sectional view through a shaft or axle bearing constructed in accordance with the preferred embodiment of my invention; and Fig. 2 is a section taken on the line 2—2 of Fig. 1.

Referring in detail to the drawing, 5 designates an axle such as is commonly found upon the ordinary vehicle, said axle having a reduced spindle 6 formed upon its end terminating in a cylindrical threaded stud 7. Upon the spindle 6, the sleeve 8 is fitted, said sleeve being of a length slightly greater than the spindle 6 and having an enlarged head or flange 9 formed upon one of its ends for abutting engagement against the shoulder 10 of the axle on the inner end of the spindle thereon.

The hub skein or boxing 11 is centrally formed with an internal annular flange 12 and also with an external annular flange 13. Between the periphery of the sleeve 8 and the wall of the axle box 11, a series of bearing rollers 14 are arranged upon each side of the internal flange 12. The longitudinal shifting movement of the inner series of rollers 14 is limited by this flange and the head 9 on the inner end of the sleeve 8. A washer plate 15 is engaged upon the axle stud 7 and is of considerably greater diameter than the sleeve 8 against the outer end of which said washer plate is engaged. This plate acts as a stop to limit the outward shifting movement of the outer series of bearing rollers 14. The washer plate 15 is formed upon its inner face with a concentrically disposed flange or boss 16 which fits within the projecting end of the sleeve 8 and bears against the end face of the axle spindle 6. A nut 17 threaded upon the stud 7, acts against the washer plate to force the same inwardly and securely clamp and fix the sleeve 8 in position upon the spindle between the shoulder 10 thereon and said washer. The opposite ends of the axle boxing 11 are exteriorly screw-threaded, as indicated at 18, to receive the hollow caps 19 and 20, respectively, which are interiorly threaded. The cap 19 is engaged upon the outer end of the axle boxing while the cap 20 is engaged upon the inner end thereof and this latter cap is formed with a central axle receiving opening indicated at 21.

22 designates the two sections of a metal jacket or hub proper which are inserted from opposite directions over the axle boxing 11 and against the opposite edges of the exterior central flange 13 thereon. Each of these hub sections 22 is of cylindrical form and provided upon its inner end with an outwardly projecting annular flange 23. It will be understood that these hub sections are first arranged in place upon the axle boxing and the caps 19 and 20 then threaded upon the ends of the boxing and against the ends of the respective hub sections, thereby forcing said sections inwardly and tightly clamping the same against the edges of the flange 13. The flanges 23 of the hub sections are provided with coinciding bolt receiving openings whereby the spokes of the body of a wheel or other shiftable element may be securely bolted in place to the hub.

From the foregoing description, taken in connection with the accompanying drawing, the construction, manner of operation and several advantages of my invention will be clearly and fully understood. It will be seen that the several elements comprising the improved bearing can be very readily assembled in place upon the axle spindle and as readily removed therefrom when it is desired to lubricate the bearing or replace any of its parts. The caps 19 and 20 effectually prevent the entrance of dust or dirt and the collection thereof upon the bearing rollers 14. These rollers afford an extensive bearing surface upon the axle sleeve and effectually reduce frictional resistance to the free rotation of the wheel or other element to a minimum. The device is also exceedingly durable and reliable in practical use and may obviously be produced at comparatively small manufacturing cost.

While I have shown and described the preferred construction and arrangement of the several parts of my improved bearing, it will be understood that the same are susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

1. The combination with a shaft, of a sleeve fixed thereon, a boxing concentrically disposed around said sleeve in spaced relation thereto and provided with internal and external centrally located annular flanges, a series of bearing rollers arranged between the sleeve and the wall of the boxing on each side of the internal flange, hub sections engaged upon said boxing, and means for tightly clamping the hub sections against the opposite edges of the external flange of the boxing.

2. The combination with a shaft, of a sleeve fixed upon the shaft and having a head on one end, a washer plate engaged upon the shaft and abutting against the other end of said sleeve, an axle boxing surrounding the sleeve and provided with internal and external centrally located annular flanges, a series of bearing rollers arranged upon each side of the internal flange between the boxing and said sleeve, the longitudinal movement of the respective series of rollers in one direction being limited by the head on said sleeve and said washer plate respectively, hub sections engaged upon the axle boxing, and means for clamping said hub sections against the opposite edges of the external flange on said boxing.

3. The combination with a shaft, of a sleeve fixed upon the shaft and having a head on one end, a washer plate engaged upon the shaft and abutting against the other end of said sleeve, an axle boxing surrounding the sleeve and provided with internal and external centrally located annular flanges, a series of bearing rollers arranged upon each side of the internal flange between the boxing and said sleeve, the longitudinal movement of the respective series of rollers in one direction being limited by the head on said sleeve and said washer plate respectively, hub sections engaged upon the axle boxing, and dust caps detachably threaded upon the opposite ends of the axle boxing adapted to force the respective hub sections inwardly thereon into clamping engagement against the opposite edges of said external flange.

4. The combination with a shaft having a spindle on one end, of a sleeve engaged upon said spindle, a head abutting against the end of the axle body, said sleeve projecting beyond the outer end of the spindle, said latter end of the spindle being formed with a threaded stud, a washer plate engaged upon said stud, a nut threaded on the stud to force said plate into clamping engagement with the end of the sleeve, an axle boxing surrounding the sleeve and having centrally located internal and external flanges, a series of bearing rollers arranged between the sleeve and boxing on each side of the internal flange and between the same and the washer plate and the head on said sleeve, hub sections insertible over the opposite ends of the boxing having outwardly projecting flanges on one of their ends for engagement against the opposite edges of the external flange on the boxing, and dust caps threaded upon the opposite ends of the boxing to force said hub sections inwardly and clamp the same against said external flange.

In testimony whereof I hereunto affix my signature in the presence of two witnesses.

JEFF N. LAMAR.

Witnesses:
M. J. BRUCE,
JAMES GADNAY.